(12) United States Patent
Kim et al.

(10) Patent No.: US 11,146,840 B2
(45) Date of Patent: Oct. 12, 2021

(54) METHOD OF REGISTERING CODE SET OF CONTROL TARGET DEVICE USING REMOTE CONTROL

(71) Applicant: OHSUNG ELECTRONICS CO., LTD., Busan (KR)

(72) Inventors: Sang Tae Kim, Daegu (KR); Beom U Jang, Daegu (KR); Hong Min Lee, Gyeongsangbuk-do (KR); Kang Mok Kim, Gumi-si (KR)

(73) Assignee: OHSUNG ELECTRONICS CO., LTD., Busan (KR)

( * ) Notice: Subject to any disclaimer, the term of this patent is extended or adjusted under 35 U.S.C. 154(b) by 0 days.

(21) Appl. No.: 16/858,078

(22) Filed: Apr. 24, 2020

(65) Prior Publication Data

US 2020/0351538 A1  Nov. 5, 2020

(30) Foreign Application Priority Data

May 2, 2019 (KR) .................. 10-2019-0051328

(51) Int. Cl.
*H04N 21/422* (2011.01)
*H04N 21/418* (2011.01)
*H04N 21/41* (2011.01)

(52) U.S. Cl.
CPC ..... *H04N 21/4182* (2013.01); *H04N 21/4126* (2013.01); *H04N 21/42221* (2013.01)

(58) Field of Classification Search
None
See application file for complete search history.

(56) References Cited

U.S. PATENT DOCUMENTS

| 6,650,248 B1* | 11/2003 | O'Donnell ............. H04N 21/47 340/12.28 |
| 7,671,758 B1* | 3/2010 | Seidel ................ H04N 5/44543 340/12.28 |
| 2003/0103088 A1* | 6/2003 | Dresti ................... H03J 1/0025 715/835 |

(Continued)

FOREIGN PATENT DOCUMENTS

| KR | 10-0785668 B1 | 12/2007 |
| KR | 10-2017-0028774 A | 3/2017 |

(Continued)

*Primary Examiner* — William J Kim
(74) *Attorney, Agent, or Firm* — Novick, Kim & Lee, PLLC; Sang Ho Lee

(57) ABSTRACT

Provided is a method of registering a code set of a control target device using a set top box, the method including receiving a manual setting start request message, which is a message requesting a start of manual setting, from the set top box; selecting one of at least two manufacturers displayed on the control target device and providing information on the selected manufacturer to the set top box; providing a total index corresponding to the selected manufacturer requested by the set top box to the set top box; checking whether the control target device is remotely controlled by transmitting a control code constituting a code set corresponding to an index displayed on the control target device to the control target device; and registering the code set as a code set for remotely controlling the control target device when the control target device is remotely controlled.

11 Claims, 7 Drawing Sheets

(56) References Cited

U.S. PATENT DOCUMENTS

| | | | |
|---|---|---|---|
| 2003/0151538 A1* | 8/2003 | Escobosa | H04N 21/41265 341/176 |
| 2007/0097273 A1* | 5/2007 | Pfiffer | H04N 21/4622 348/734 |
| 2009/0003240 A1* | 1/2009 | Negron | H04L 41/0813 370/254 |
| 2009/0237287 A1* | 9/2009 | D'Hoore | H04N 21/42226 341/176 |
| 2011/0102158 A1* | 5/2011 | Haughawout | H04N 21/42204 340/12.29 |
| 2011/0157469 A1* | 6/2011 | McRae | H04N 21/42226 348/554 |
| 2011/0157478 A1* | 6/2011 | McRae | H04N 21/41265 348/734 |
| 2011/0298646 A1* | 12/2011 | Hellemans | H04N 21/42225 341/176 |
| 2012/0210268 A1* | 8/2012 | Hilbrink | G06F 3/04817 715/773 |
| 2013/0132094 A1* | 5/2013 | Lim | G10L 15/22 704/275 |
| 2015/0042892 A1* | 2/2015 | McRae | H04N 21/42204 348/734 |
| 2017/0195611 A1* | 7/2017 | Yoon | H04N 21/42226 |
| 2017/0278384 A1 | 9/2017 | Ham et al. | |

FOREIGN PATENT DOCUMENTS

| | | |
|---|---|---|
| KR | 10-1816723 B1 | 1/2018 |
| KR | 10-1881773 B1 | 7/2018 |
| KR | 10-1914295 B1 | 11/2018 |

\* cited by examiner

Please select a TV manufacturer you are using.

| company A |
| company B |
| company C |
| company D |
| company E |

FIG. 3

METHOD OF REGISTERING CODE SET OF CONTROL TARGET DEVICE USING REMOTE CONTROL

TECHNICAL FIELD

The present invention relates to a method of registering a code set of a control target device using a remote control and, more particularly, to a method of registering a code set of a control target device using a set top box connected to a remote control and a control target device.

BACKGROUND ART

Recently, the technology of remotely controlling various electronic devices used in home using a remote control has become common, and the number of remote controls held in each home has increased.

As the number of remote controls used in the home increases, it becomes difficult to manage the remote controls and it is hard to know where the remote control is, and thus an integrated remote control incorporating functions of several remote controls has been developed.

The integrated remote control stores a control program capable of controlling multiple electronic devices in one remote control. The integrated remote control outputs a control signal for controlling the electronic device to be controlled.

However, the integrated remote control in the related art could not control the television and video playback device at the same time, and when a user inputs a code set assigned to the corresponding electronic device (television), the user could control only the television corresponding to the code set.

In addition, the corresponding electronic device can be controlled using a user terminal in which a remote control application is installed, but in order to control the electronic device, a process of registering a code set capable of controlling the electronic device should be preceded.

In addition, when registering the code set for TV control, the integrated remote control in the related art performs the registration using channel up/down keys until the TV is turned off after entering the mode. However, from the user's point of view, it is difficult to check whether the code set registration is normally performed, and when the number of set numbers in the remote control is large, it takes a lot of time to register the code set.

In addition, in the case of the remote control in the related art, since the registration procedure is directly performed with the TV using IR communication when registering the code set, the remote control should is directed to the TV. In addition, since IR communication is used, when an obstacle is located between the TV and the remote control, a problem arises that a smooth registration procedure cannot be performed.

DISCLOSURE

Technical Problem

The present invention has been made to solve the above problems, and it is an object of the present invention to provide a method of allowing a user to directly check a code set registration procedure.

Another objective of the present invention is to provide a method capable of performing a code set registration procedure even when the remote control is not directed to a TV that is a control target device.

Another objective of the present invention is to provide a method capable of performing a code set registration procedure even when an obstacle is located between the remote control and the TV.

In addition, another objective of the present invention is to provide a method for reducing the time required for code set registration of a control target device.

Technical Solution

In order to achieve the objectives of the present invention, the present invention provides a method of registering a control code of a control target device using a remote control, the method including receiving a manual setting start request message, which is a message requesting a start of manual setting, from the set top box; selecting one of at least two manufacturers displayed on the control target device and providing information on the selected manufacturer to the set top box; providing a total index corresponding to the selected manufacturer requested by the set top box to the set top box; checking whether the control target device is remotely controlled by transmitting a control code constituting a code set corresponding to an index displayed on the control target device to the control target device; and registering the code set as a code set for remotely controlling the control target device when the control target device is remotely controlled.

In order to achieve the objectives of the present invention, the present invention provides a method of registering a control code of a control target device using a remote control, the method including receiving a manual setting key code message including a key code for manual setting from a remote control or receiving an event for requesting a start of manual setting; when a response message for the start of manual setting is received from the remote control or the event for requesting the start of manual setting is input, requesting to display a manufacturer capable of manual setting to the control target device; requesting a total index corresponding to the manufacturer selected by the remote control to the remote control; requesting to provide, to the control target device, information on the total index provided from the remote control for displaying; when an index selected from the indexes displayed on the control target device is provided from the remote control, requesting to display the selected index in such a manner as to be distinguished from other indexes to the control target device, and requesting to transmit a control code constituting a code set corresponding to the selected index to the control target device; and when the control target device is remotely controlled by the control code requested to be transmitted, terminating the manual setting according to a request from the remote control or by an input event.

Advantageous Effects

The method of registering a code set of a control target device using a remote control according to the present invention can allow a user to directly check a code set registration procedure and shorten the time required for code set registration of a control target device.

In addition, since the present invention uses RF communication in addition to IR communication, even when an obstacle is located between the remote control and the TV, or the remote control is not directed to the TV that is a control target device, there is an effect that the code set registration procedure may be performed at the time of using the RF communication.

DESCRIPTION OF DRAWINGS

FIG. 3 is a diagram showing information displayed on a control target device according to a request from a set top box according to an embodiment of the present invention.

MODE FOR INVENTION

The foregoing and additional aspects of the present invention will become more apparent through preferred embodiments described with reference to the accompanying drawings. Hereinafter, it will be described in detail so that those skilled in the art can easily understand and reproduce the present invention through the embodiments.

Figure 1:
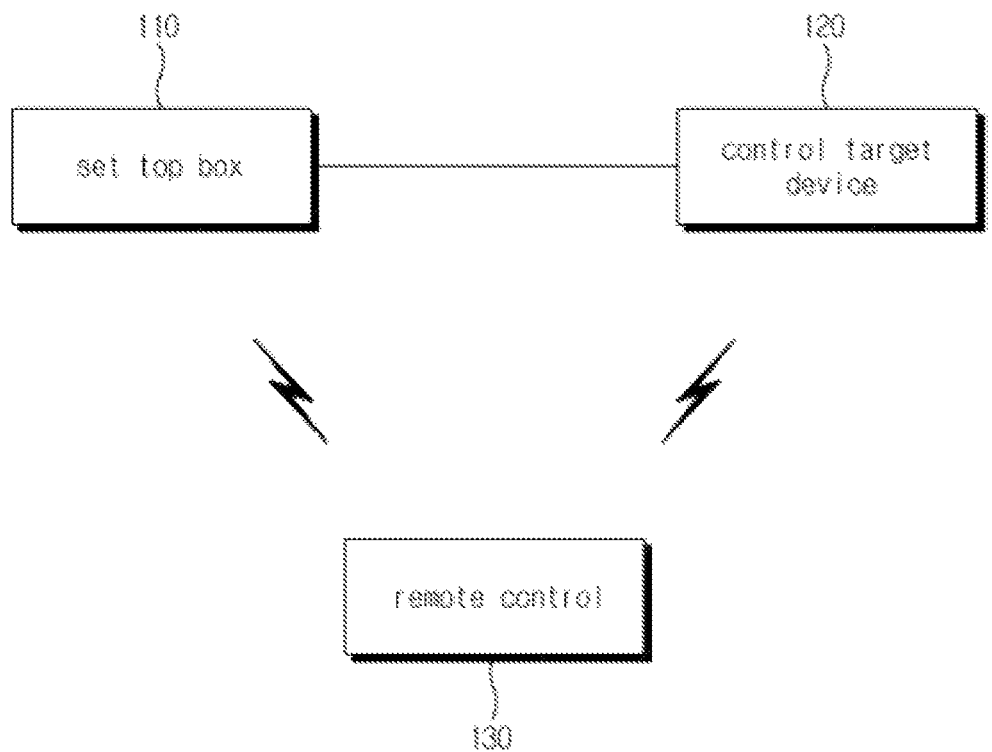
FIG. 1 is a diagram showing a system that registers a code set of a control target device using a remote control according to an embodiment of the present invention.

FIG. 1 is a diagram showing a system that registers a code set of a control target device using a remote control according to an embodiment of the present invention. Hereinafter, a system registering a code set of a control target device using a remote control according to an embodiment of the present invention will be described in detail with reference to FIG. 1.

Referring to FIG. 1, a system registering a code set of a control target device using a remote control includes a control target device, a set top box, and a remote control. Of course, other configurations than the above-described configuration may be included in the system registering the code set of the control target device using the remote control proposed in the present invention.

In order to register a code set of a control target device 120 using a remote control 130, the present invention proposes a manner of transmitting an RF signal to a set top box 110 and registering a code set of a control target device 120 in the set top box 110, without transmitting an IR signal to the control target device 120. To this end, the set top box 110 and the control target device 120 are connected to each other through a cable.

The control target device 120 is connected to the set top box 110 through a cable. The control target device 120 performs IR communication with the remote control 130, and receives a code set including a control code via IR communication. In more detail, the control target device 120 is controlled by a code set received from the remote control 130 through IR communication.

The control target device 120 displays necessary information according to a request from the set top box 110. According to the present invention, the control target device 120 displays manufacturers for which code set registration is required, and displays a manufacturer selected among the displayed manufacturers in a distinguishable manner from other manufacturers.

In addition, the control target device 120 displays an index associated with the code set. For example, the code set and the index are displayed in such a manner that code set 1 is matched with index 1, code set 2 is matched with index 2, and code set 3 is matched with index 3.

The control target device 120 stores the code set to be operated according to control signals received from the set top box 110 or remote control 130 and is operated according to a control code constituting the stored code set. In more detail, when a control code associated with a power is received from the outside, the control target device 120 turns the power on or off. When a control code referred to as "increase the volume" is received from the outside, the control target device 120 increases a volume. In this way, the control target device 120 performs the operation according to the control code received from the outside.

The set top box 110 is connected to the control target device 120 through a cable, and provides or receives necessary information using the cable. The set top box 110 performs RF communication with the remote control 130. The set top box 110 transmits necessary signals among the signals received from the remote control 130 to the control target device 120. As an example, the set top box 110 may request to display manufacturer information to the control target device 120, and may also request to display an index in connection with the present invention.

The set top box 110 transmits and receives the necessary signals to and from the remote control 130. The information transmitted and received between the set top box 110 and the remote control 130 will be described later.

The remote control 130 performs communication with the set top box 110 or the control target device 120. The remote control 130 performs RF communication with the set top box 110 and performs IR communication with the control target device 120. The remote control 130 transmits and receives necessary information to and from the set top box 110 through RF communication and remotely controls the control target device 120 through IR communication.

Figure 2A:
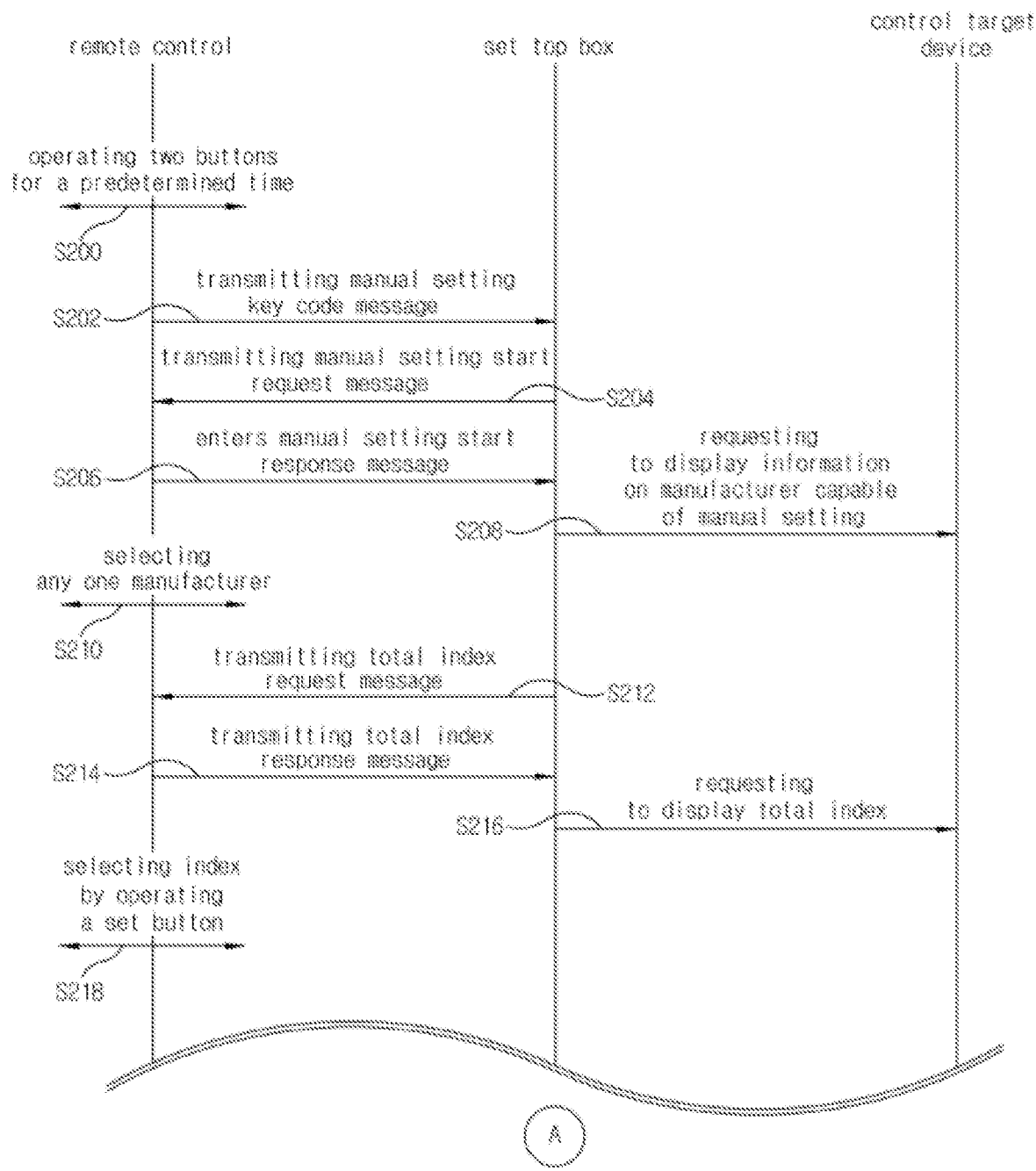
FIGS. 2A and 2B are flow charts showing an operation performed in a system registering a code set of a control target device using a remote control according to an embodiment of the present invention.
Figure 2B:
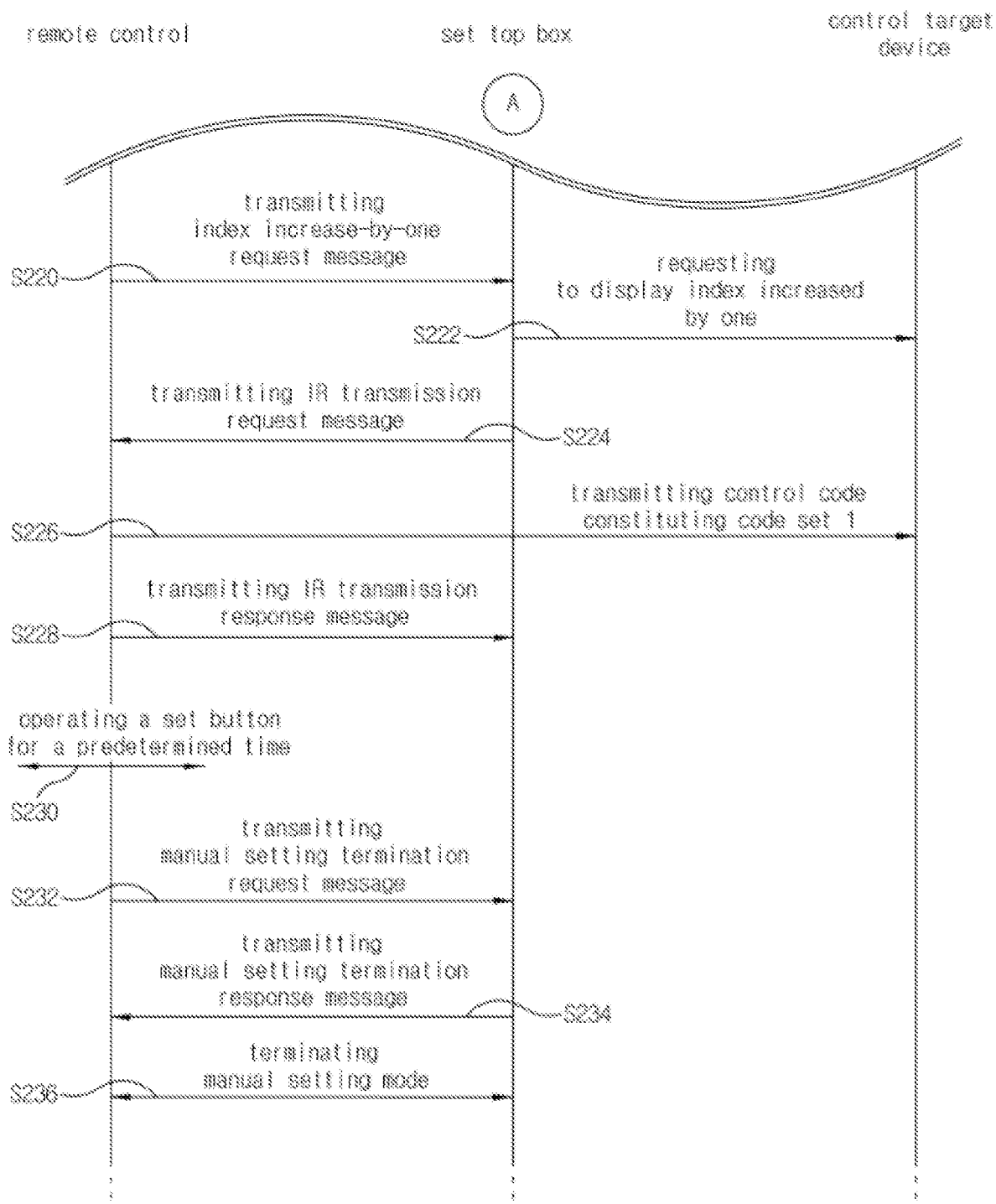

FIGS. 2A and 2B show an operation performed in a system registering a code set of a control target device using a remote control according to an embodiment of the present invention. Hereinafter, an operation performed in a system registering a code set of a control target device using a remote control according to an embodiment of the present invention will be described in detail with reference to FIGS. 2A and 2B.

According to FIGS. 2A and 2B, a system registering a code set of a control target device using a remote control includes a remote control, a set top box, and a control target device. Of course, other configurations than the configuration described above may be included in the system registering the code set of the control target device using the remote control proposed in the present invention.

In step S200, the remote control operates a TV power button and a home button for a predetermined time. Of course, other buttons may be used in addition to the TV power button and the home button. That is, according to the present invention, at least two buttons may be operated for a predetermined time.

In step S202, the remote control transmits a message containing a key code for manual setting (hereinafter, referred to as a "manual setting key code message") to a set top box using an RF signal.

In step S204, the set top box transmits a message requesting the start of manual setting corresponding to the manual setting key code (hereinafter referred to as a "manual setting start request message") to the remote control using an RF signal. The remote control that receives the manual setting start request message enters a manual setting mode without any separate button operation.

In step S206, the remote control that enters the manual setting mode transmits a manual setting start response message corresponding to the manual setting start request message to the set top box using the RF signal. The manual setting start response message includes information indicating that the remote control has entered the manual setting mode. In addition, the present invention will be mainly described with respect to a method of registering a code set in the manual setting mode.

In step S208, the set top box requests to display information on a manufacturer capable of manual setting to the connected control target device. The control target device displays the information on the manufacturer capable of manual setting according to the request from the set top box.

FIG. 3 is a diagram showing information displayed on a control target device according to a request from a set top box according to an embodiment of the present invention.

It may be seen from FIG. 3 that the control target device displays information on at least two manufacturers capable of manual setting.

In step S210, the remote control selects one of at least two manufacturers displayed using the set button. The selected information is provided to the set top box using a RF signal.

In step S212, the set top box transmits a total index request message that is a message for requesting the total index corresponding to the selected manufacturers using the RF signal to the remote control.

In step S214, the remote control transmits a total index response message corresponding to the manufacturer. After the remote control checks how many code sets corresponding to the manufacturer there are, the total index response message is provided to the set top box by including the index information corresponding to the checked number thereto. For example, when the number of code sets stored in relation to the manufacturer is 12, the remote control may notify the set top box that the total index is 12. Of course, the remote control matches the code set for each index and stores the same. That is, the index and the code set are stored, in such a manner that index 1 is matched with code set 1, index 2 with code set 2, index 3 with code set 3, and so on.

Figure 4:
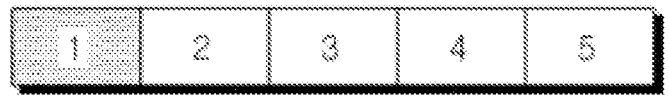
FIG. 4 is a diagram showing a control target device displaying a total index according to an embodiment of the present invention.

In step S216, the set top box requests to display the total index provided from the remote control. The remote control displays the total index at the request from the set top box. The remote control can display the total index or only a part thereof on one screen. Of course, when only a part is displayed, the remaining indexes not displayed through the button operation may be also displayed. FIG. 4 shows a control target device displaying a total index according to an embodiment of the present invention. According to FIG. 4, the control target device displays index 1 to index 5 of the total index.

In step S218, the remote control selects an index by operating the channel button. As an example, the remote control selects an index from at least two indexes displayed on the control target device by operating a "channel+" button. When there is no index selected among the previously displayed indexes, index 1 is selected by operating the "channel+" button. When there is an existing selected index, an index increased by one from the previously selected index is selected by operating the "channel+" button. Of course, it is possible to select the index displayed on the control target device using a button other than the channel button.

In step S220, the remote control transmits an index increase-by-one request message to the set top box using a RF signal.

In step S222, the set top box requests to display an index increased by one to the control target device, and the control target device displays an index increased by one according to the request from the set top box. Of course, as described above, when there is no previously selected index, index 1 is selected. This is explicitly shown in FIG. 4. That is, the control target device displays the selected index in such a manner as to be distinguished from other indexes.

In step S224, the set top box transmits an IR transmission request message to the remote control.

In step S226, the remote control receiving the IR transmission request message transmits a control code constituting code set 1 matching with index 1 to the control target device. Of course, the remote control transmits the control code using the IR signal to the control target device. According to the present invention, the remote control may transmit, to the control target device, a control code associated with volume or a control code associated with power, and also transmit, to the control target device, a control code capable of checking whether the control target device operates according to the control code.

In step S228, the remote control transmits the IR transmission response message to the set top box when transmission of the set control code is completed. The IR transmission response message indicates that transmission of some control codes among control codes constituting code set 1 corresponding to index 1 is completed.

When the control target device is operated according to the transmitted control code, the user terminates the code set registration. Hereinafter, a procedure of terminating the code set registration will be described.

In step S230, the remote control operates an "OK" button for a predetermined time. Of course, a button other than the above-described button may be operated for a predetermined time.

In step S232, the remote control transmits, to the set top box, a manual setting termination request message meaning that manual setting is completed, and in step S234, the set top box transmits a manual setting termination response message to the remote control.

In step S236, the set top box terminates the manual setting mode, and the remote control also terminates the manual setting mode and then enters the normal mode. In addition, the remote control registers a code set that remotely controls the control target device. That is, as the code set capable of remotely controlling the control target device, code set 1 is registered and stored.

As described above, the present invention proposes a method of registering a code set of a control target device in the remote control in such a manner that the remote control uses RF communication with the set top box and IR communication with the control target device.

Hereinafter, the case where the control target device is not normally controlled by the control code in step S228 will be described.

Figure 5:
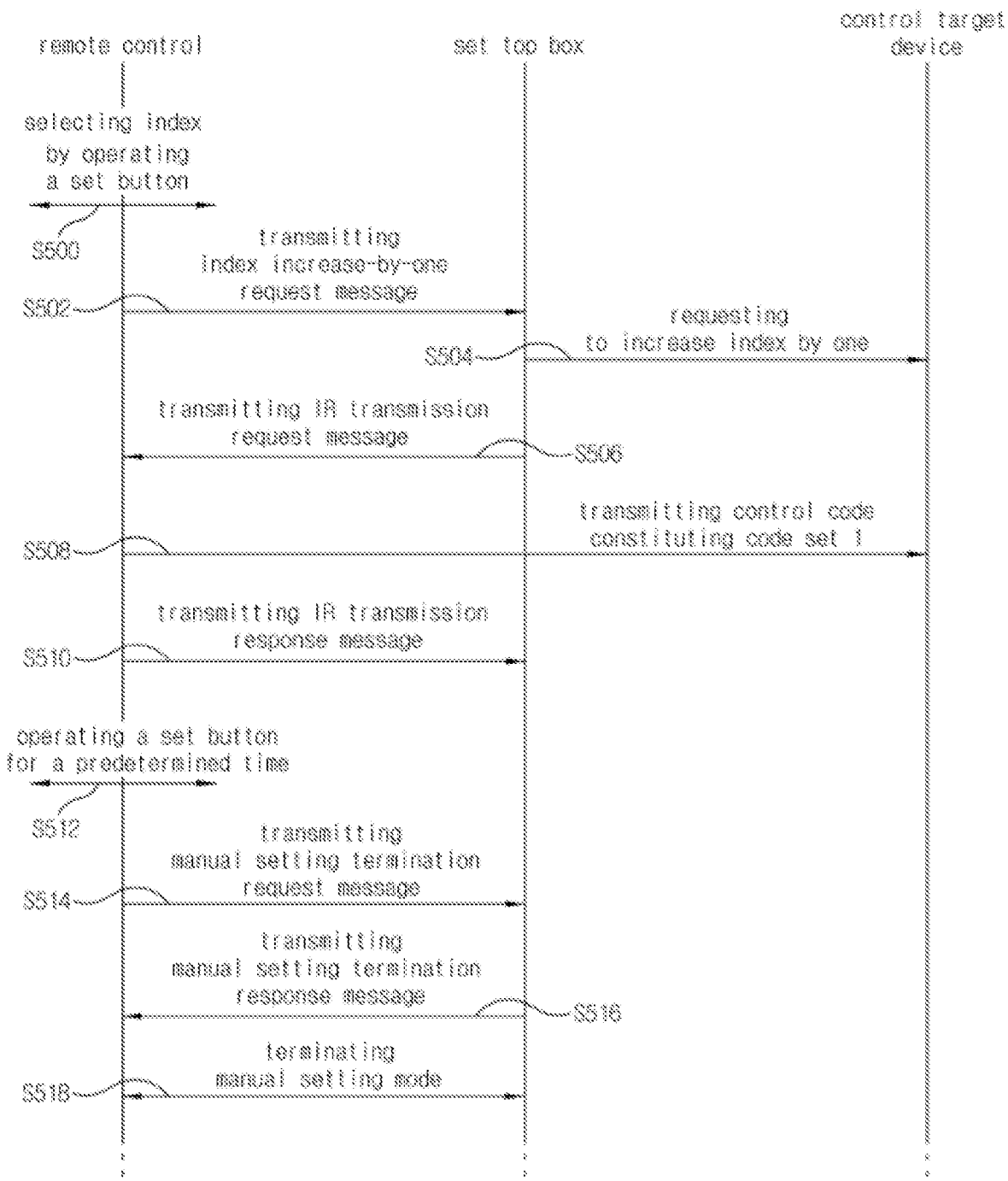
FIG. 5 is a diagram showing an operation performed in a system registering a code set of a control target device using a remote control according to an embodiment of the present invention.

FIG. 5 is a diagram showing an operation performed in a system registering a code set of a control target device using a remote control according to an embodiment of the present invention. Hereinafter, an operation performed in a system registering a code set of a control target device using a remote control according to an embodiment of the present invention will be described in detail with reference to FIG. 5.

In step S500, the remote control selects an index by operating a channel button. For example, the remote control selects the index by operating a "channel+" button. When the previously selected index is index 1, index 2 is selected by operating the "channel+" button. Of course, it is possible to select the index using a button other than the channel button.

In step S502, the remote control transmits an index increase-by-one request message to the set top box using a RF signal.

Figure 6:
FIG. 6 is a diagram showing an example in which an index is increased according to an embodiment of the present invention.

In step S504, the set top box requests to increase the index by one to the control target device, and the control target device increases the index by 1 according to the request from the set top box. Of course, as described above, when the previously selected index is index 1, index 2 is selected according to the index increase request, which is explicitly shown in FIG. 6.

In step S506, the set top box transmits an IR transmission request message to the remote control.

In step S508, the remote control receiving the IR transmission request message transmits a control code constituting a code set 2 matching with an index 2 to the control target device. Of course, the remote control transmits the control code using the IR signal to the control target device. In connection with the present invention, the remote control may transmit, to a control target device, a control code associated with a volume or a control code associated with a power, and also transmit, to the control target device, a control code capable of checking whether the control target device is operated according to the control code.

In step S510, the remote control transmits an IR transmission response message to the set top box when transmission of the set control code is completed. The IR transmission response message indicates that transmission of some control codes among control codes constituting a code set 2 corresponding to an index 2 is completed.

In step S512, the remote control operates an "OK" button for a predetermined time. Of course, other button other than the button may be operated for the predetermined time.

In step S514, the remote control transmits, to the set top box, a manual setting termination request message meaning that the manual setting is completed, and in step S516, the set top box transmits a manual setting termination response message to the remote control.

In step S518, the set top box terminates the manual setting mode, and the remote control also terminates the manual setting mode and then enters the normal mode. In addition, the remote control registers a code set that remotely controls the control target device. That is, as a code set capable of being remotely controlled by the control target device, the code set 2 is registered and stored.

As described above, the present invention proposes a method of selecting an index displayed on a control target device using a channel button, in which the index is increased by operating the button "channel+", and the index is decreased by operating the button "channel-". Of course, it is obvious that the index may be selected using a volume button or other buttons, in addition to the channel button.

The present invention is described as entering a manual setting mode by operating the button using the remote control, but is not limited thereto. That is, the set top box may transmit a manual setting start request message to the remote control according to a specific event occurring in the set top box.

In addition, with respect with the manual setting termination request message, the set top box may transmit the manual setting termination request message to the remote control, according to a specific event occurring in the set top box, instead of operating a specific button on the remote control.

The present invention has been described with reference to one embodiment shown in the drawings, but this is merely exemplary, and those skilled in the art will understand that various modifications and other equivalent embodiments are possible therefrom.

The invention claimed is:

1. A method of registering a control code of a control target device using a remote control, the method comprising:
   receiving, by the remote control, a manual setting start request message, which is a message requesting a start of manual setting, from a set top box;
   selecting, by the remote control, one of at least two manufacturers displayed on the control target device and providing information on the selected manufacturer to the set top box;
   checking, by the remote control, the number of code sets stored in the remote control corresponding to the selected manufacturer in response to a request from the set top box, and providing the checked number of code sets to the set top box;
   selecting, by the remote control, one index from a plurality of indexes indicating the provided number of code sets and displayed on the control target device, and transmitting a control code constituting a code set corresponding to the selected index to the control target device;
   checking, by the remote control, whether the control target device is remotely controlled by the control code transmitted to the control target device; and
   registering, by the remote control, the code set as a code set for remotely controlling the control target device when the control target device is remotely controlled.

2. The method of claim 1, further comprising:
   prior to the receiving of the manual setting start request message,
   transmitting, by the remote control, a manual setting key code message including a key code for manual setting to the set top box when a first button on the remote control is operated,
   wherein the first button is different from a second button on the remote control.

3. The method of claim 1, wherein the receiving of the manual setting start request message includes receiving the manual setting start request message from the set top box that receives an event for requesting the start of manual setting.

4. The method of claim 1, further comprising:
   after the receiving of the manual setting start request message, which is the message requesting the start of manual setting from the set top box,
   transmitting, by the remote control, a manual setting start response message corresponding to the manual setting start request message to the set top box.

5. The method of claim 1, wherein the remote control performs communication with the set top box in a first communication manner and performs communication with the control target device in a second communication manner.

6. The method of claim 2, wherein a third button on the remote control is used to select one index from the plurality of indexes displayed on the control target device, and information on the selected index is provided to the set top box in a first communication manner.

7. The method of claim 6, wherein the checking whether the control target device is remotely controlled includes:
selecting, by the remote control, an index of at least two indexes displayed on the control target device using the third button;
receiving an IR (Infrared) transmission request message requesting to transmit the control code constituting the code set corresponding to the index selected from the set top box to the control target device in a second communication manner;
transmitting the control code constituting the code set corresponding to the selected index to the control target device in the second communication manner to remotely control the control target device; and
transmitting an IR (Infrared) transmission response message to the set top box in response to transmitting the control code constituting the code set corresponding to the selected index to the control target device in the second communication manner.

8. A method of registering a control code of a control target device using a remote control, the method comprising:
receiving, by a set top box, a manual setting key code message including a key code for manual setting from the remote control or receiving an event for requesting a start of manual setting;
when a response message for the start of manual setting is received from the remote control or the event for requesting the start of manual setting is input, requesting, by the set top box, to display at least two manufacturers capable of manual setting to the control target device;
requesting, by the set top box, the number of code sets stored in the remote control corresponding to a manufacturer selected by the remote control;
requesting, by the set top box, to display a plurality of indexes to the control target device, so that the number of code sets provided from the remote control can be displayed;
when an index selected from the plurality of indexes displayed on the control target device is provided from the remote control, requesting to display the selected index in such a manner as to be distinguished from other indexes to the control target device, and requesting to transmit a control code constituting a code set corresponding to the selected index to the control target device; and
when the control target device is remotely controlled by the control code requested to be transmitted, terminating the manual setting according to a request from the remote control or by an input event.

9. The method of claim 8, wherein the set top box performs communication with the control target device in a second communication manner and performs communication with the remote control in a first communication method.

10. The method of claim 8, wherein the number of the plurality of indexes is related to the number of code sets stored in the remote control capable of being remotely controlled with respect to the selected manufacturer.

11. The method of claim 8, wherein the control code includes a control code associated with a power command.

* * * * *